United States Patent Office 3,330,781
Patented July 11, 1967

3,330,781
POLYURETHANE PLASTICS PREPARED FROM ALKYLENE OXIDE ADDUCTS OF COMPOSITIONS COMPRISING A MAJOR PORTION OF TRIHYDROXYDIPHENYL
Paul G. Gemeinhardt, Sisterville, W. Va., assignor to Mobay Chemical Company, Pittsburgh, Pa., a corporation of Delaware
No Drawing. Filed May 7, 1962, Ser. No. 193,656
10 Claims. (Cl. 260—2.5)

This invention relates to polyurethanes and to methods for the production thereof as well as to polyethers to be used for the production of polyurethanes and to methods for the production of the polyethers.

The production of polyurethanes has been a rapidly expanding industry in recent years. Polyurethanes have found utility in a number of areas among which are the preparation of coatings, elastomers, molded objects, adhesives and foam or cellular material. Polyurethane plastics can be prepared by reacting a compound containing reactive hydrogen with an organic polyisocyanate and a small amount of water in the presence of a suitable activator. The growing commercial importance if polyurethanes has caused considerable effort to be directed toward producing products with the best combination of chemical and physical properties, while at the same time employing the most economical raw materials which would best satisfy the dual requirements of economy and quantity in the product.

It is therefore an object of the present invention to provide improved polyurethane plastics. It is an object of this invention to provide polyurethanes which have a high aromatic content and which have improved chemical and physical properties. It is an object of this invention to provide polyurethanes that are hydrophobic, flame resistant, dimensionally stable and color stable. It is another object of this invention to provide polyurethanes having excellent combinations of chemical and physical properties capable of being used in the preparation of coatings, elastomers, molded objects, adhesives, foams and the like. It is still another object of this invention to provide polyethers suitable for use in the production of the aforementioned polyurethanes. It is a further object of this invention to provide a process for the production of improved polyurethanes.

The foregoing objects and others which will become apparent from the following description are accomplished in accordance with the invention, generally speaking, by providing improved polyurethane plastics having very desirable chemical and physical properties and prepared by reacting an organic polyisocyanate or an organic polyisothiocyanate with a polyether having the following generic formula:

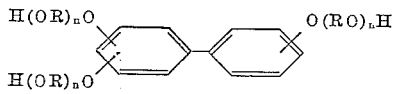

wherein R is a lower alkylene radical having preferably from 2 to 6 carbon atoms and $n$ is an integer of at least 1 and sufficiently large enough to give the polyether a molecular weight in the range of about 330 to about 5000.

Any suitable polyether having the foregoing generic formula may be used. It is preferred to use a polyether prepared by the condensation of a lower alkylene oxide containing 2 to 6 carbon atoms and a trihydroxydiphenyl. Depending upon the ultimate end use, the polyethers of this invention possess a hydroxyl number of preferably from about 25 to about 510 and a viscosity at 25° C. of preferably about 400 centipoises to solid which softens at about 50° C. Although the polyethers having a molecular weight range of preferably from about 330 to about 5000 can be used, it is most preferred to use polyethers having molecular weights of from about 350 to about 3500. Condensation of a lower alkylene oxide with the phenolic hydroxyl groups of a trihydroxydiphenyl, in the manner described above, produces a material with greater activity for subsequent reaction with an isocyanate, while at the same time converting the solid trihydroxydiphenyl to a liquid, thus making it particularly adaptable for use in the preparation of polyurethanes. The use of the foregoing polyethers in the preparation of polyurethane plastics provides polyurethanes possessing improved chemical and physical properties such as, for example, hydrolytic stability, flame resistance, color stability, dimensional stability, and the like.

Though the production of polyurethanes and polyethers, according to the present invention, has just been described as based on trihydroxydiphenyl, it is also possible and sometimes preferred to employ in place of pure trihydroxydiphenyl a more readily available and less expensive starting material, such as, for example, "RM 441." "RM 441" is a solid resinous material which is obtained by Koppers Company as a residue remaining in the still after removing technical grade resorcinol as a distillate. It comprises a major portion, generally about 88 percent by weight of trihydroxydiphenyl with the balance believed to be small portions of dihydroxydiphenyl and further condensation products of resorcinol. When using "RM 441" to produce polyether-type resins the above defined ranges of molecular weight, hydroxyl number and viscosity should be present in the final resin. In general, a molar ratio of alkylene oxide to "RM 441" of (3–109):(1) is suitable to produce the desired properties.

The material "RM 441" has been fully described and defined in United States Patent No. 2,753,312, issued July 3, 1956 to Loren J. Miller. The following disclosure of that patent is incorporated herein by reference:

"'RM 441' is a designation given by Koppers Company to a solid resinous material, which is obtained by them as a residue remaining in the still after removing technical grade resorcinol as a distillate. A typical ultimate chemical analysis of this material (the percentages given being by weight) is as follows:

| | Percent |
|---|---|
| Sulphur | 2.8 |
| Ash | 0.2 |
| Carbon | 70.8 |
| Hydrogen | 5.5 |
| Oxygen | balance |

"Physically, 'RM 441' is a dark brown, brittle material having the following characteristics:

| | |
|---|---|
| Ball and ring softening point, ° C. | 80 to 88 |
| Water solubility, percent | 20 to 25 |
| Isopropyl alcohol solubility, percent | 94 to 98½ |

"If technical grade resorcinol is heated at about 200° C., there is produced a dark colored material appearing and responding similarly to all the tests above given as to 'RM 441.' Thus, 'RM 441' is believed to consist essentially of a condensation product (or mixture thereof) derived from resorcinol under the influence of heat. It is also known, due to its origin. that 'RM 441' in its present commercial form contains relatively small amounts of impurities normally occurring incident to the commercial manufacture of technical grade resorcinol, for example, small or trace amounts of 3 mercapto phenol ($C_6H_4$—OH—SH).

"'RM 441' can be distilled at low pressure to give about 55% of a yellow oily distillate, which will partially crystallize. The crystals amount to about 60% of the distillate (33% of the original 'RM 441'), and melt at about 136° C. These crystals, when analyzed correctly, are found to be trihydroxydiphenyl.

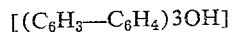

the positions of the hydroxyl groups on the two rings being unknown. The oily portion of the distillate, representing about 22% of the entire 'RM 441,' also contains trihydroxydiphenyl, again with the positions of the hydroxyl groups unknown. There is also identified in this oily portion small portions of dihydroxydiphenyl, again with the positions of the hydroxyl groups unknown. The balance of the 'RM 441' has not been fully or positively identified, but is believed to contain further condensation products of resorcinol, similar in some respects to be trihydroxydiphenyl above referred to, and including compounds having a plurality, probably three or more, phenyl groups linked in either straight or branched chains and with some —OH groups thereon. This material is believed to be created by the polymerizing or coupling action of heat upon resorcinol, eliminating water, probably similar to a linkage formed between two resorcinol molecules as follows:

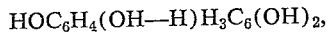

resulting in the chaining together, in either straight or branched chains or both, of a number of the original resorcinol molecules. It is further believed that in most instances there is at least one —OH group remaining on each of the phenyl rings, although this has not been identified. Furthermore, in and end group of a chain, it seems likely that there are two hydroxyl groups remaining on the ring. For example, a compound of the kind visualized could be expressed by the formula:

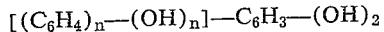

Again, in this group of compounds, which is assumed to be reasonably representative of a substantial portion of the 'RM 441' the positions of the several remaining —OH groups are unknown. It is believed that 'RM 441' or a material substantially equivalent and which should for the purposes of the present application be considered as 'RM 441,' is also formed when pure resorcinol is heated to 200° C., probably due to one or more molecules of water splitting off, leaving in each instance a phenol ring deficient in hydrogen; then the phenol molecular deficiency is subject to attachment to another ring as well as with resorcinol per se in order to balance the molecules.

"While there is herein included not only specific technical data which has been exactly obtained as to the characteristics of 'RM 441,' there is also included all that is presently known of this material. It will be understood that any theory expressed herein in this connection is given for what it may be worth, and is not to be considered as specifically limiting upon the definition of the material, but that any material derived from the sources above set forth and/or having physical and chemical characteristics generally similar to that particularly described for 'RM 441,' is to be considered as 'RM 441' for the purposes of this application, including the claims appended hereto.

"It will further be understood that inasmuch as 'RM 441' is obtained commercially as a still residue, and as the distillation operation by which it is produced may be a batch operation, the composition may differ somewhat from time to time.

"'RM 441' may be briefly defined as a solid resinous material comprising a residue remaining in the still after removing technical grade resorcinol as a distillate."

In view of the above explanation it will be seen that the present invention relates not only to the polyether prepared from pure trihydroxydiphenyl and a lower alkylene oxide, but also to a polyether-type resin prepared from the reaction product of a lower alkylene oxide and crude trihydroxydiphenyl in the form of "RM 441" or similar materials wherein trihydroxydiphenyl consitutes the major ingredient.

As has been stated above, in the production of the polyethers and polyether-type resins in this invention, any suitable lower alkylene oxide having from 2 to 6 carbon atoms in the chain may be used, such as, for example, ethylene oxide, 1,2-propylene oxide, 1,2-butylene oxide, 2,2-butylene oxide, 1,2-pentylene oxide, 2,3-pentylene oxide, hexylene oxide and the like. In producing the polyethers and polyether-type resins according to this invention, the alkylene oxide is added to pure or crude trihydroxydiphenyl at a temperature preferably between 50 and 30° C., and most preferably about 150–250° C. and a pressure of preferably about 0–125 p.s.i.g., and most preferably about 15–100 p.s.i.g. The reaction may be conducted in the presence of a catalyst, e.g., potassium hydroxide, sodium hydroxide, or other alkaline catalysts, though when employing crude trihydroxydiphenyl in the form of "RM 441," it has been found that no catalyst is generally necessary since this material is of sufficient basicity. In general, the crude or pure trihydroxydiphenyl is charged to a reactor and liquified by heating preferably to about 80° C., after which the alkylene oxide is passed into the molten material under the above-indicated gage pressures, while permitting the temperature of the reaction mixture to rise preferably to about 140–210° C. during the addition. Samples of reaction mass may be taken at regular intervals for hydroxyl number determination and the reaction is discontinued when the desired hydroxyl number is obtained.

In preparing polyurethanes, according to the present invention, the polyether or polyether-type resin described above is reacted with any suitable organic aliphatic, aromatic, or heterocyclic isocyanate or isothiocyanate. Included, for example, are alkylene polyisocyanates and polyisothiocyanates, such as propylene-1,2-diisocyanate,
butylene-1,2-diisocyanate,
butylene-1,3-diisocyanate,
butylene-2,3-diisocyanate,
butylene-1,3-diisothiocyanate,
hexamethylenediisocyanate, and
hexamethylenediisothiocyanate;

alkylidene polyisocyanates and polyisothiocyanates, such as, for example, ethylidine diisocyanate,
butylidine diisocyanate and
ethylidine diisothiocyanate;

cycloalkylene diisocyanates and diisothiocyanates, such as, for example, cyclopentylene-1,3-diisocyanate,
cyclohexylene-1,2-diisocyanate,
cyclohexylene-1,3-diisocyanate,
cyclohexylene-1,4-diisocyanate, and
cyclohexylene-1,2-diisothiocyanate;

cycloalkylidene polyisocyanates and polyisothiocyanates, such as, for example, cyclopentylidene diisocyanate,
cyclohexylidene diisocyanate and
cyclohexylidene diisothiocyanate;

aromatic polyisocyanates and polyisothiocyanates, such as, for example, m-phenylene diisocyanate,
p-phenylene diisocyanate,
1-methyl-2,4-phenylene diisocyanate,
naphthylene-1,4-diisocyanate,
diphenylene-4,4-diisocyanate or p-phenylene diisothiocyanate,
2,4-toluylene diisocyanate,
2,6-toluylene diisocyanate,
xylylene-1,4-diisocyanate,
xylylene-1,3-diisocyanate,
1,5-naphthalene diisocyanate,
4,4′-diphenylmethane diisocyanate,
4,4′-diphenylpropane diisocyanate or
xylylene-1,4-diisothiocyanate,
triphenyl methane triisocyanate;

methyl, ethyl, propyl, butyl, octyl, dodecyl, octadecyl, phenyl, cyclohexyl, p-chlorophenyl carbamyl chlorides;

heterocyclic polyisocyanates and polyisothiocyanates, such as, for example, furfurylidene diisocyanate and furfurylidene diisothiocyanate and the like.

Any suitable mixture of the aforementioned isocyanates as well as unrefined or crude isocyanates may also be used. For example, crude toluylene diisocyanates can be obtained by the phosgenation of a mixture of toluylene diamines and crude diphenylmethane isocyanates can be obtained by the phosgenation of crude diphenylmethane diamine, the reaction product of aniline and formaldehyde in the presence of HCl. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100 °C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4-toluylene diamine and 20 percent 2,6-toluylene diamine containing 90 percent of a mixture of about 80 percent 2,4-toluylene diisocyanate and 20 percent 2,6-toluylene diisocyanate and the balance polymers incapable of accurate analysis.

In preparing polyurethanes from the interaction of isocyanates and the polyether or polyether-type resin described above, the desired properties of the final product determine the precise starting materials used as well as the nature of the process and the inclusion or omission of added ingredients. For example, in the production of polyurethane foams by interaction of the polyethers with polyisocyanates, there is preferably used a stoichiometric amount or slight excess of polyisocyanate.

It is often advantageous to carry out the reaction in the presence of a catalyst. Any suitable catalyst may be used such as, for example, dibutyl tin di-2-ethyl hexoate, stannous octoate, triethylene diamine, N-ethyl morpholine, N-methyl morpholine, dimethyllauryl amine, and the like. In many cases it is desirable and in some cases necessary to carry out the reaction in the presence of a stabilizer or emulsifier such as, for example, a silicone copolymer having the generic formula:

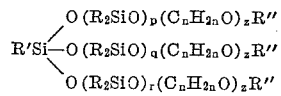

wherein R, R′, and R″ are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Halohydrocarbons, either alone or with $H_2O$, in conjunction with the balance of the components of the polyurethane plastic may also be employed. Any suitable blowing agent which is a gas at the reaction temperature such as, for example Freon, either alone or with $H_2O$, dichlorodifluoromethane, trichlorofluoromethane, dichlorofluoromethane, dichlorotetrafluoroethane and the like may be used to exhibit a beneficial effect on the properties of the polyurethane plastic. The employment of these compounds is not an essential feature of the invention, however.

When preparing a rigid polyurethane foam, the polyether employed as a starting material preferably has a hydroxyl number in excess of about 200, and most preferably from about 250 to about 500, while when preparing flexible foams polyethers having a lower hydroxyl number, e.g., of the order of 50, are preferred. Semirigid foams, of course, are best prepared from polyethers having hydroxyl numbers intermediate of those used in the flexible and rigid foams.

In preparing polyurethane coatings, lacquers, films, and the like by the interaction of polyisocyanates and the above-described polyethers, the quantity of isocyanates used generally about the equivalent necessary for interaction with the hydroxyl groupings of the polyether and preferably is in the range of from about 0.75 to about 1.5 equivalents of isocyanate groups for each equivalent of hydroxyl group.

In preparing coatings, the reaction between the isocyanate or the partial condensation product of isocyanate with a polyol and the polyether is advantageously carried out in the presence of a suitable solvent and/or diluent, e.g., ethylacetate, ethoxyethylacetate, methylisobutyl ketone, Cellosolve acetate, cyclohexanone, toluene and xylene. If desired, there are pigments and fillers well known in the art which may be added to give color or body to the coating. Such pigments and fillers include titanium dioxide, lithopone, iron oxide, carbon black, china clay, and barytes. The solution is applied to a support, for example, a metal sheet or wood, polyaddition and cross-linking taking place after evaporation of the solvent in the cold or by heating.

Elastomeric or rubber-like polyurethanes are obtained, for example, by reacting the polyhydric polyether with a substantial excess of the diisocyanate to prepare a prepolymer containing an excess of isocyanate groups. This prepolymer is then chain extended by the addition of a cross-linking agent, e.g., aliphatic or aromatic diamines, dihydric alcohols or water. The product may then be cured at an elevated temperature until the elastomer is formed. Generally, polyhydric polyethers having a molecular weight preferably of about 500–2500 produce elastomeric products having the most desirable properties.

Molding compounds can be obtained if the polyethers are mixed substantially in molar ratio of the reactive hydroxyl groups with diisocyanate, relatively large amounts of suitable fillers, such as sawdust, chalk, carbon black, iron oxide, or colloidal silica, are added and the polyaddition and cross-linkings are allowed to proceed under pressure at elevated temperatures.

In order to more fully elucidate the present invention, the following specific examples are presented. It is intended that these examples be considered as illustrative, rather than limiting on the invention disclosed and claimed herein. In the examples, all parts are by weight if not otherwise stated.

Example 1

In this and the following examples the equipment employed comprises a stainless steel reactor equipped with bottom outlet, baffles, stirrer and stirrer motor, heating mantle, thermocouple, safety valve, alkylene oxide inlet fitting and a port for charging and withdrawing samples, said port being closed by means of a screw cap. Into the reactor there is charged about 3,810 parts of "RM 441" which is liquefied by heating to about 80° C. There is then supplied to the reactor from a stainless steel container which is pressurized with nitrogen at about 10–15 p.s.i.g., about 7,620 parts of 1,2-propylene oxide over a period of about 28 hours while the temperature of the reaction mixture is maintained at about 95–140° C. At the end of the reaction there is obtained a polyether product having a hydroxyl number of 296.7, an acid number of 0.36, a viscosity of 43,000 centipoises at 25° C. and a pH of 12.2 and a water content of 0.05 percent.

Example 2

The process of Example 1 is repeated using about 4,015 parts of "RM 441" and about 4,527 parts of 1,2-propylene oxide while maintaining the temperature of the reaction mixture at about 83–183° C. for a period of about 11 hours. In this example about 10 parts of potassium hydroxide is included in the reaction mixture as a catalyst. There is produced a polyether product having a hydroxyl number of 401.4, an acid number of 0.87, a water content of 0.08 percent, a viscosity in excess of 100,000 centipoises at 25° C. and a pH of 10.3.

Example 3

The process of Example 1 is repeated using about 3,000 parts of "RM 441" and about 4,500 parts of 1,2-propylene oxide while the reaction temperature is maintained between about 120 and 200° C. over a period of about 24 hours. The reaction product has a hydroxyl number of 294.1, an acid number of 1.78, a water content of 0.04 percent, a viscosity of 91,700 centipoises at 25° C. and a pH of 12.5. This reaction product is neutralized with hydrochloric acid to a pH of 6.5.

Example 4

The process of Example 1 is repeated in this example using about 9,600 parts of "RM 441" and about 24,440 parts of 1,2-propylene oxide while maintaining the reaction at a temperature of about 112–210° C. for a period of about 35 hours. After about seven hours of the reaction there is added about 9.6 parts of potassium hydroxide catalyst. The polyether reaction product has a hydroxyl number of 227.2, an acid number of 0.85, a water content of 0.06 percent, a viscosity of 10,700 centipoises at 25° C. and a pH of 8.2.

Example 5

About 100 parts of the polyether product obtained in Example 1 are mixed with about 46 parts of a mixture comprising 80 percent 2,4-toluylene diisocyanate and 20 percent 2,6-toluylene diisocyanate, about 0.05 part of stannous octoate, about 0.02 part of 1-methyl-4-dimethyl aminoethyl piperazine, about 20 parts of trichloromonofluoromethane and about 1.80 parts of a silicone copolymer having the formula

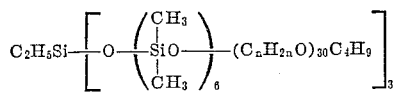

where $(C_nH_{2n}O)$ is a mixed polyoxyethylene and oxypropylene block copolymer containing about 17 oxyethylene units and about 13 oxypropylene units on a machine mixer as disclosed in U.S. Reissue 24,514 and discharged into a mold. The foam produced, after it has cured at room temperature for about 24 hours, has a density of 2.0 pounds per cubic foot. After a two-week period while the foam is maintained at a temperature of about 158° F. and 100 percent relative humidity there is noted a volume change by reduction of about 9 percent.

Example 6

About 100 parts of a polyether resin obtained by the reaction of "RM 441" with propylene oxide to a molecular weight of about 3000 and a hydroxyl number of about 56, is mixed with about 38 parts of a mixture of 80 percent, 2,4-toluylene diisocyanate and 20 percent 2,6-toluylene diisocyanate, about 0.3 part of stannous octoate, about 0.05 part of 1-methyl-4-dimethyl aminoethyl piperazine, about 0.5 part of N-ethyl morpholine, about 2.9 parts of water and about 1 part of the silicone copolymer having the formula shown in Examples 6 and 7. The foam produced has a density of about 2 lbs./ft.³ and contains essentially open cells. The K value is less than 0.25 and the compression deflection is about 0.4 p.s.i. at 25% deflection.

Example 7

To a flask equipped with a reflux condenser, a suitable heating means and agitator is added about 100 parts of a polyether resin obtained by the reaction of "RM 441" with propylene oxide to a molecular weight of about 500 and an hydroxyl number of about 335, about 41 parts of the partial condensation product of trimethylol propane and butanediol with 80 percent 2,4-toluylene diisocyanate and 20 percent 2,6-toluylene diisocyanate. This partial condensation product is based on about 70 percent by weight of trimethylol propane, and about 30 percent by weight of butanediol, while about 3 equivalents of isocyanate are present for each equivalent of hydroxyl. The flask also contains about 36 parts of ethyl acetate, about 36 parts of ethoxy ethylacetate, about 36 parts of toluene, about 36 parts of xylene and about 3 parts of cellulose acetate butyrate. The reaction product solution is applied to an unpainted steel plate by brush and dries to a tack-free film in about one hour. The film has excellent abrasion resistance, flexibility, and resistance to chemical solvents.

Example 8

In this example an elastomer is prepared by adding about 27.8 parts of a mixture of about 80 percent 2,4-toluylene diisocyanate and about 20 percent 2,6-toluylene diisocyanate to about 100 parts of a polyether obtained by the reaction of 2,4,6-trihydroxydiphenyl with propylene oxide to a molecular weight of about 2000 and a hydroxyl number of about 84. The mixture is heated at about 85° C. until an —NCO content of about 6.5 percent is reached. After cooling, about 100 parts of this prepolymer are heated to about 100° C. and added to about 20.6 parts of 4,4-diamino-3,3-dichloro-diphenylmethane heated to about 110° C. These reactants are mixed and poured into a mold heated at about 110° C. After solidification the elastomer is removed from the mold and cured for about 24 hours at about 125° C. The rubber-elastic material obtained has high tensile strength, good moduli and elongation values, good resistance to solvents, oils and greases, and good abrasion and hydrolysis resistance.

In the above description and specific examples there have been shown novel polyurethanes as well as novel polyhydricpolyethers used in the manufacture thereof. These polyurethanes serve as excellent materials in the production of coatings, elastomers, adhesives, molded bodies, and cellular products. It is understood that any other suitable organic polyisocyanates, blowing agents, catalysts, stabilizers, alkylene oxides, polyether adducts of pure or crude trihydroxydiphenyl, and the like described herein, can be substituted for the particular ones employed in the preceding examples with satisfactory results providing the teachings of the preceding disclosure are followed.

Although the invention has been described in consider-

What is claimed is:

1. A polyurethane comprising the reaction product of at least one compound selected from the group consisting of organic polyisocyanates and polyisothiocyanates and a polyether-type resin comprising the reaction product of (a) an alkylene oxide having 2 to 6 carbon atoms and (b) a solid resinous material comprising a residue remaining in the still after removing technical grade resorcinol as a distillate, said solid resinous material being a dark brown brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, said polyether-type resin having a hydroxyl number of about 25 to 510, a viscosity at 25° C. of about 400 centipoises to solid which softens at about 50° C., and a molar ratio of alkylene oxide to said solid resinous material of about 3–109:1.

2. A polyurethane comprising the reaction product of (a) a mixture of 2,4- and 2,6-toluylene diisocyanate and a polyether-type resin comprising the reaction product of propylene oxide and (b) a solid resinous material comprising a residue remaining in the still after removing technical grade resorcinol as a distillate, said solid resinous material being a dark brown, brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, said polyether-type resin having a hydroxyl number of 250–500.

3. A process of preparing a polyurethane comprising reacting at least one compound selected from the group consisting of organic polyisocyanates and polythiocyanates with a polyhydric polyether comprising the reaction product of (a) an alkylene oxide having 2 to 6 carbon atoms and (b) a solid resinous material comprising a residue remaining in the still after removing technical grade resorcinol as a distillate, said solid resinous material being a dark brown brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, said polyhydric polyether having an hydroxyl number of about 25 to 510, a viscosity at 25° C. of about 400 centipoises to solid which softens at about 50° C., and a molar ratio of alkylene oxide to said solid resinous material of about (3–109):(1).

4. The process of claim 3 wherein the alkylene oxide is 1,2-propylene oxide.

5. A polyhydric polyether comprising the reaction product of (a) an alkylene oxide having 2 to 6 carbon atoms and (b) a solid resinous material comprising a residue remaining in the still after removing technical grade resorcinol as a distillate, said solid resinous material being a dark brown, brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, said polyhydric polyether having a hydroxyl number of about 25 to 510, a viscosity at 25° C. of about 400 centipoises to solid which softens at about 50° C., and a molar ratio of alkylene oxide to said solid resinous material of about (3–109):(1).

6. The polyhydric polyether of claim 5 wherein said alkylene oxide is 1,2-propylene oxide.

7. A polyhydric polyether comprising the reaction product of (a) propylene oxide and (b) a solid resinous material comprising a residue remaining in the still after removing technical grade resorcinol as a distillate, said solid resinous material being a dark brown, brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, said polyhydric polyether having a hydroxyl number of 250–500.

8. A process of preparing a polyhydric polyether comprising reacting (a) a polyalkylene oxide having 2 to 6 carbon atoms with (b) a solid resinous material comprising a residue remaining in the still after removing technical grade resorcinol as a distillate, said solid resinous material being a dark brown, brittle material having the following characteristics:

Ball and ring softening point, ° C. _____ 80 to 88
Water solubility, percent _____ 20 to 25
Isopropyl alcohol solubility, percent _____ 94 to 98½ and containing a trihydroxydiphenyl having the formula $(C_6H_3—C_6H_4)3OH$ and dihydroxydiphenyl, at a temperature of about 50–300° C. until a hydroxyl number of about 250–500 is reached.

9. The process of claim 8 wherein said polyalkylene oxide is propylene oxide.

10. A polyurethane plastic comprising the reaction product of an organic polyisocyanate and a polyhydric polyether prepared by condensing a lower alkylene oxide with a compound containing a major portion of trihydroxydiphenyl and a minor portion of dihydroxydiphenyl and further condensation products of resorcinol, said condensation products having more than two benzene rings and possessing the following characteristics:

Ball and ring softening point, ° C. _____ 80 to 88
Water solubility, percent _____ 20 to 25
Isopropyl alcohol solubility, percent _____ 94 to 98½

References Cited

UNITED STATES PATENTS

| | | | |
|---|---|---|---|
| 2,753,312 | 7/1956 | Miller | 260—17.4 XR |
| 3,075,927 | 1/1963 | Lanham | 260—2.5 |
| 3,164,565 | 1/1965 | Calamari | 260—77.5 XR |

OTHER REFERENCES

Chemical Abstracts, vol. 39, Dec. 20, 1945, No. 24, page 5880.

DONALD E. CZAJA, Primary Examiner.

WILLIAM H. SHORT, LEON J. BERCOVITZ, Examiners.

G. W. RAUCHFUSS, Assistant Examiner.